UNITED STATES PATENT OFFICE.

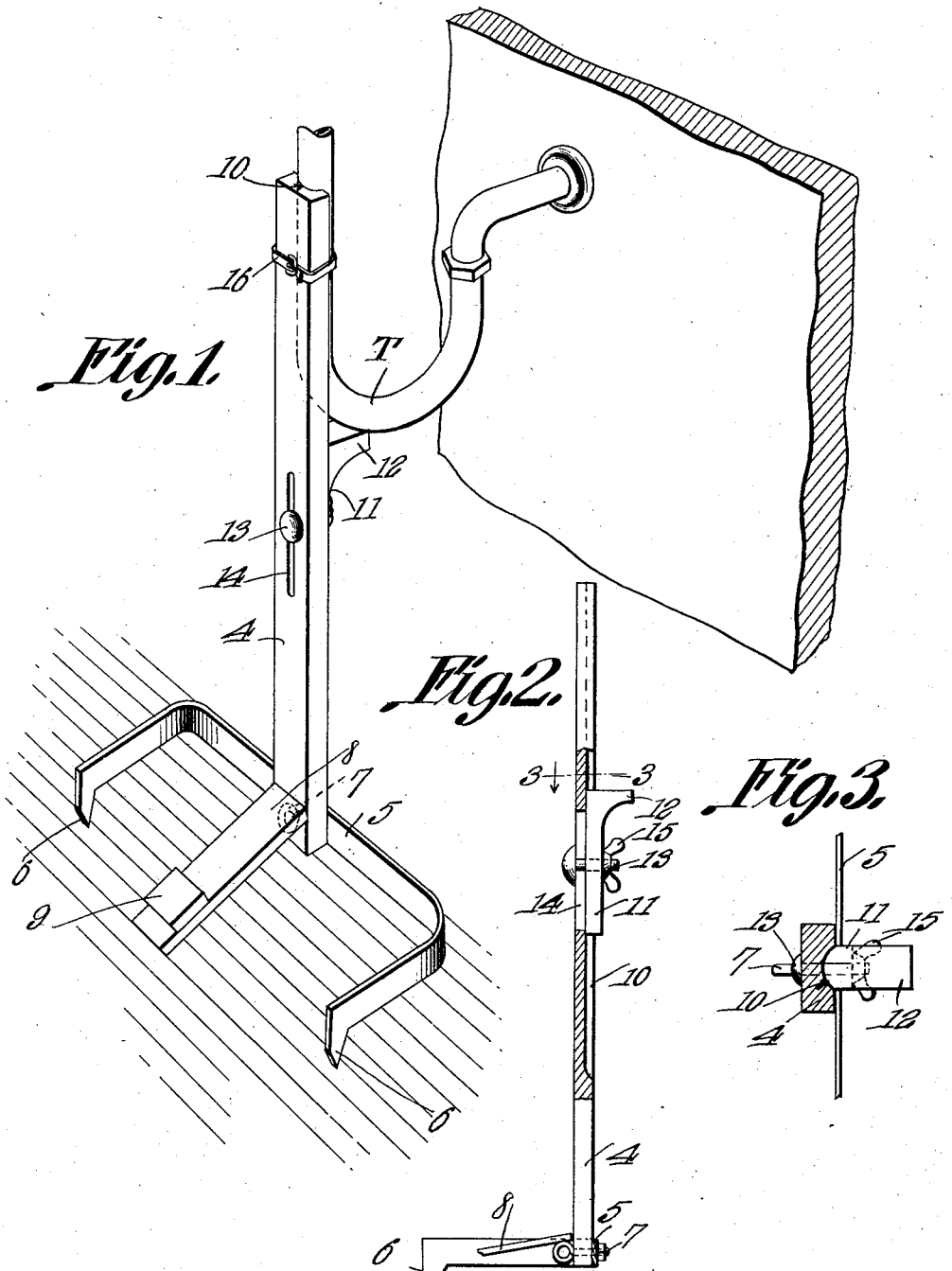

HENRY STOFFEL, OF TULSA, OKLAHOMA.

TRAP-HOLDER.

1,062,051. Specification of Letters Patent. Patented May 20, 1913.

Application filed November 21, 1912. Serial No. 732,796.

*To all whom it may concern:*

Be it known that I, HENRY STOFFEL, a citizen of the United States, residing at Tulsa, in the county of Tulsa and State of Oklahoma, have invented a new and useful Trap-Holder, of which the following is a specification.

The present invention appertains to a plumber's tool or implement, and particularly to a trap holder, it being the object of the present invention to provide a novel and improved trap holder for wall sinks, basins or bowls, in order that the trap may be firmly held in position while the plumber's joint is wiped between the trap and the sink, basin or bowl, or for any other purpose.

It is also the object of the present invention to provide a device of the character indicated which shall be compact so as not to encumber the trap when applied thereto, which shall be adjustable and readily applicable to various traps, and shall be simple, durable, substantial and inexpensive in construction, as well as efficient, convenient and serviceable in its use.

To the above and other ends, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The preferred embodiment of the invention has been illustrated in the accompanying drawing, wherein:—

Figure 1 is a perspective view of the device as applied to a trap. Fig. 2 is a side elevation of the device, parts being broken away. Fig. 3 is an enlarged sectional detail taken on the line 3—3 of Fig. 2.

Referring specifically to the drawing, the present implement embodies in its essentials, an upright or standard 4 fashioned from a bar of wood or any other suitable material of proper dimensions, and a U-shaped base member 5 having its intermediate portion secured to the rear face of the upright at its lower end, the arms of the member 5 projecting forwardly at the sides of the upright. The arms of the member 5 are provided with depending spurs or prongs 6 at their ends designed to engage the floor and prevent the device from slipping or being otherwise displaced on the floor or surface. The spurs or prongs 6 also provide fulcrums for the upright, it being noted that the upright will be constrained to swing rearwardly when downward pressure is applied to the upright. The member 5 is secured to the lower end of the upright 4 by means of a bolt 7 which is preferably in the form of an eye-bolt, with the eye arranged forwardly.

A treadle or board 8 is adapted to rest on the floor at one end and on the eye-bolt 7 at its other end, the said board having a suitable weight 9 secured thereon in order to give a rearward swinging tendency to the upright.

The upright 4 is provided with a longitudinal groove or channel 10 in its rear face, and a block 11 is slidable in the said groove, said groove terminating short of the lower end of the upright and extending to the upper end of the upright. The block 11 is provided with a projection or ledge 12 at its upper end providing a trap rest, and a clamping bolt 13 carried by the block 11 passes through a longitudinal slot 14 in the upright. A wing nut 15 is mounted on the clamping bolt 13 and when tightened clamps the block or trap rest in its adjusted position.

An ordinary strap 16 embodying a buckle has been provided for securing or strapping the trap to the upper end of the upright, as will hereinafter appear.

In use, the upper end of the upright is brought adjacent the outer or forward arm of the trap T after the trap has been properly adjusted or set, and the trap is engaged by the upper end of the groove 10. The strap 16 is then passed around the upper end of the upright and the trap so as to securely hold the trap and upright together, or in order to hold the trap within the groove of the upright. The block 11 is then adjusted after loosening the bolt 13, so that the trap rest 12 engages the bottom of the trap, in which event the bolt 13 is tightened so as to secure the trap rest in position for supporting the trap properly. The weighted board 8 in being applied as illustrated and described will give a rearwardly swinging tendency to the upright so as to tend to force the trap rearwardly or toward the wall joint. The prongs or spurs 6 in engaging the floor will prevent the upright from swinging sidewise and will cause the trap to be firmly braced or held in position for effecting the joints between the sink, basin, bowl or the like and the trap, or for any other purpose as will be apparent to those versed in the art.

It is evident that the present implement may be employed for bracing or holding various traps, and may be employed in a convenient, efficient and ready manner.

Having thus described the invention what is claimed as new is:—

1. A trap holder embodying an upright, a U-shaped member having its intermediate portion secured to the lower end of the upright with its arms projecting forwardly at the sides of the upright and provided with floor engaging fulcrums at their ends so that downward pressure on the upright will constrain it to swing rearwardly, and means for clamping a trap to the rear side of the upright.

2. A trap holder embodying an upright, forwardly projecting arms attached to the lower end of the upright and arranged at the sides of the upright, the free ends of the arms having floor engaging fulcrums, so that downward pressure on the upright will constrain it to swing rearwardly, means for clamping a trap against the rear side of the upright, and a trap rest adjustable longitudinally on the upright.

3. A trap holder embodying an upright having a longitudinal trap receiving groove, forwardly projecting arms attached to the lower end of the upright and arranged at the sides of the upright, the free ends of the arms having floor engaging means, means for holding the trap in the upper end of the said groove, and a trap rest adjustably mounted in the said groove.

4. A trap holder embodying an upright having a longitudinal groove in its rear face, a U-shaped member having its intermediate portion secured to the lower end of the upright with its arms projecting forwardly and provided with depending floor engaging spurs at their ends, means for holding a trap in the upper end of the said groove, a block slidable in the groove, and means for clamping the block in position.

5. A trap holder embodying an upright having a longitudinal groove in its rear face and having a longitudinal slot, a U-shaped member having its intermediate portion secured to the lower end of the upright with its arms projecting forwardly and provided with depending floor engaging spurs at their ends, a strap adapted to embrace the upper end of the upright and a trap fitting in the said groove, a block slidable in the groove and having a projection at its upper end forming a trap rest, and a clamping bolt carried by the block and working through the said slot.

In testimony that I claim the foregoing as my own, I have hereto affixed my signature in the presence of two witnesses.

HENRY STOFFEL.

Witnesses:
B. F. MOORE,
R. E. BERGER.

---

Copies of this patent may be obtained for five cents each, by addressing the "Commissioner of Patents, Washington, D. C."